(12) United States Patent
Mullick et al.

(10) Patent No.: US 10,798,530 B2
(45) Date of Patent: Oct. 6, 2020

(54) OPTIMIZATION OF BROADCAST AND MULTICAST FRAME DELIVERY IN POWER-SAVE MODE

(71) Applicant: MediaTek Singapore Pte. Ltd., Singapore (SG)

(72) Inventors: Joyjit Mullick, Noida (IN); Ashish Kumar, Ranchi (IN); Saurabh Agarwal, Noida (IN); Abhishek Chaudhary, Baraut (IN); Abhijit Uplenchwar, Noida (IN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 78 days.

(21) Appl. No.: 15/838,225

(22) Filed: Dec. 11, 2017

(65) Prior Publication Data

US 2019/0182630 A1  Jun. 13, 2019

(51) Int. Cl.
*H04W 4/06*  (2009.01)
*H04W 52/02*  (2009.01)
(Continued)

(52) U.S. Cl.
CPC ......... *H04W 4/06* (2013.01); *H04W 52/0209* (2013.01); *H04L 12/189* (2013.01); *H04W 84/12* (2013.01)

(58) Field of Classification Search
CPC ..... H04W 4/06; H04W 4/70; H04W 52/0206; H04W 52/0209; H04W 52/0216; H04W 52/0219; H04W 52/0225; H04W 52/0229; H04W 72/005; H04W 72/0446; H04W 72/08; H04W 74/006; H04W 74/04; H04W 84/12; H04W 88/08; H04L 12/189; H04L 5/0048; H04L 5/0055; H04L 69/22; H04L 69/324; Y02D 70/00; Y02D 70/21; Y02D 70/22; Y02D 70/142; Y02D 70/144; Y02D 70/1222; Y02D 70/1224; Y02D 70/1262; Y02D 70/1264
See application file for complete search history.

(56) References Cited

U.S. PATENT DOCUMENTS

| | | | | |
|---|---|---|---|---|
| 2004/0072559 A1* | 4/2004 | Kakumaru | ........ | H04W 52/0229 455/422.1 |
| 2005/0254444 A1* | 11/2005 | Meier | ...................... | H04W 4/06 370/312 |

(Continued)

OTHER PUBLICATIONS

Taiwan Intellectual Property Office, Office Action for Taiwan Patent Application No. 107141348, dated Aug. 7, 2019.

*Primary Examiner* — Sulaiman Nooristany
(74) *Attorney, Agent, or Firm* — Han IP PLLC; Andy M. Han

(57) ABSTRACT

Schemes, methods and examples for optimization of broadcast and multicast frame delivery when at least one client device in a basic service set (BSS) is in a power-save mode are described. A communication apparatus associated with a BSS receives a broadcast or multicast frame after a first Delivery Traffic Indication Map (DTIM). The communication apparatus transmits the broadcast or multicast frame to at least a first client device in the BSS, without buffering the broadcast or multicast frame for transmission following a second DTIM which is subsequent the first DTIM, while at least a second client device in the BSS is in a power-save mode.

20 Claims, 5 Drawing Sheets

(51) Int. Cl.
*H04L 12/18* (2006.01)
*H04W 84/12* (2009.01)

(56) References Cited

U.S. PATENT DOCUMENTS

| | | | |
|---|---|---|---|
| 2006/0092868 A1* | 5/2006 | Meier | H04L 12/1886 370/312 |
| 2007/0286121 A1* | 12/2007 | Kolakowski | H04L 29/06027 370/329 |
| 2008/0025256 A1* | 1/2008 | Ginzburg | H04L 12/1881 370/329 |
| 2009/0016306 A1* | 1/2009 | Wang | H04W 74/006 370/338 |
| 2009/0097438 A1* | 4/2009 | Kneckt | H04W 52/0235 370/328 |
| 2010/0080162 A1 | 4/2010 | Igarashi et al. | |
| 2013/0250832 A1* | 9/2013 | Kim | H04W 52/0216 370/311 |
| 2014/0281623 A1* | 9/2014 | Zhang | G06F 1/3234 713/323 |
| 2014/0321415 A1* | 10/2014 | You | H04W 36/0055 370/329 |
| 2015/0237578 A1* | 8/2015 | Gogate | H04W 52/0225 370/311 |
| 2015/0334654 A1* | 11/2015 | Choi | H04W 4/70 370/311 |
| 2016/0174108 A1* | 6/2016 | Jeong | H04B 7/155 370/315 |
| 2016/0219510 A1* | 7/2016 | Asterjadhi | H04W 52/0274 |

* cited by examiner

500

RECEIVE, BY A COMMUNICATION APPARATUS ASSOCIATED WITH A BASIC SERVICE SET (BSS), A BROADCAST OR MULTICAST FRAME AFTER A FIRST DELIVERY TRAFFIC INDICATION MAP (DTIM)
510

TRANSMIT, BY THE COMMUNICATION APPARATUS, THE BROADCAST OR MULTICAST FRAME TO AT LEAST A FIRST CLIENT DEVICE IN THE BSS, WITHOUT BUFFERING THE BROADCAST OR MULTICAST FRAME FOR TRANSMISSION FOLLOWING A SECOND DTIM WHICH IS SUBSEQUENT THE FIRST DTIM, WHILE AT LEAST A SECOND CLIENT DEVICE IN THE BSS IS IN A POWER-SAVE MODE
520

FIG. 5

OPTIMIZATION OF BROADCAST AND MULTICAST FRAME DELIVERY IN POWER-SAVE MODE

TECHNICAL FIELD

The present disclosure is generally related to computer networking and, more particularly, to optimization of broadcast and multicast frame delivery.

BACKGROUND

Unless otherwise indicated herein, approaches described in this section are not prior art to the claims listed below and are not admitted as prior art by inclusion in this section.

According to the Institute of Electrical and Electronics Engineers (IEEE) 802.11 specifications, data frames for broadcast and multicast transmissions are to be buffered by an access point (AP) or software-enabled AP (SoftAP) of a basic service set (BSS) if any client device in the BSS is in a power-save mode, and transmission of the buffered frames would occur at Delivery Traffic Indication Map (DTIM) beacons irrespective of one or more other client devices in the BSS not being in the power-save mode. However, there may be cases in which there are some broadcast and/or multicast frames destined for client device(s) (or group(s) of client devices) in a BSS not in power-save but still buffered due to aforementioned IEEE 802.11 requirement. This would result in unnecessary delay in areas such as, for example, protocols like Address Resolution Protocol (ARP), Dynamic Host Configuration Protocol (DHCP) and the like, as well as multiple multicast group groups in a BSS. Although it is possible to reduce the DTIM period to reduce the delay, but a side effect would be increased power consumption and decreased battery life for all connected client devices, since the client devices would need to wake up more frequently to receive broadcast and multicast frames.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose novel schemes, solutions, mechanisms, methods and systems for optimization of broadcast and multicast frame delivery to client devices in a BSS when at least one of the client devices is in power-save mode.

In one aspect, a method may involve a communication apparatus associated with a BSS receiving a broadcast or multicast frame after a first DTIM. The method may also involve the communication apparatus transmitting the broadcast or multicast frame to at least a first client device in the BSS, without buffering the broadcast or multicast frame for transmission following a second DTIM which is subsequent the first DTIM, while at least a second client device in the BSS is in a power-save mode.

In one aspect, an apparatus may include a communication device and a processor coupled to the communication device. The communication device may be capable of wirelessly receiving and transmitting data. The processor may be capable of receiving, via the communication device, a broadcast or multicast frame after a first DTIM. The processor may also be capable of transmitting, via the communication device, the broadcast or multicast frame to at least a first client device in a BSS with which the apparatus is associated, without buffering the broadcast or multicast frame for transmission following a second DTIM which is subsequent the first DTIM, while at least a second client device in the BSS is in a power-save mode.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 5 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

In various implementations in accordance with the present disclosure, an AP/SoftAP may check whether a current broadcast frame is destined for any client device in a BSS associated with the AP/SoftAP that is not in the power-save mode. Moreover, the AP/SoftAP may check whether a current multicast frame is destined for any client device or any group of client devices in the BSS that is/are not in the power-save mode. In an event that the AP/SoftAP identifies any client device or group of client devices not in power-save mode and to which the broadcast or multicast frame is destined, the AP/SoftAP may transmit the broadcast or multicast frame to such client device or group of client devices without buffering the broadcast/multicast frame until a subsequent DTIM period.

Various implementations in accordance with the present disclosure may be fully compatible with current and legacy wireless local area network (WLAN) devices since there is no proprietary hardware required. The reduction in delay in transmission of broadcast and/or multicast frames may improve corresponding broadcast/multicast performance, thereby improving user experience especially in time-sensitive applications (e.g., watching live-streaming videos). The reduction in delay in transmission of broadcast frames may also help achieve faster Internet Protocol (IP) address assignment leading to seamless roaming as client devices roam from one BSS to another BSS. Moreover, as destination(s) (e.g., client device(s)) of broadcast/multicast frames would be identified before transmission of the broadcast/multicast frames in accordance with the present disclosure, the first bit in the Traffic Indication Map (TIM) in DTIM beacon, indexed by association identification (AID) 0, would not be set and, consequently, more power saving may be achieved for client devices in the BSS.

Figure 1:
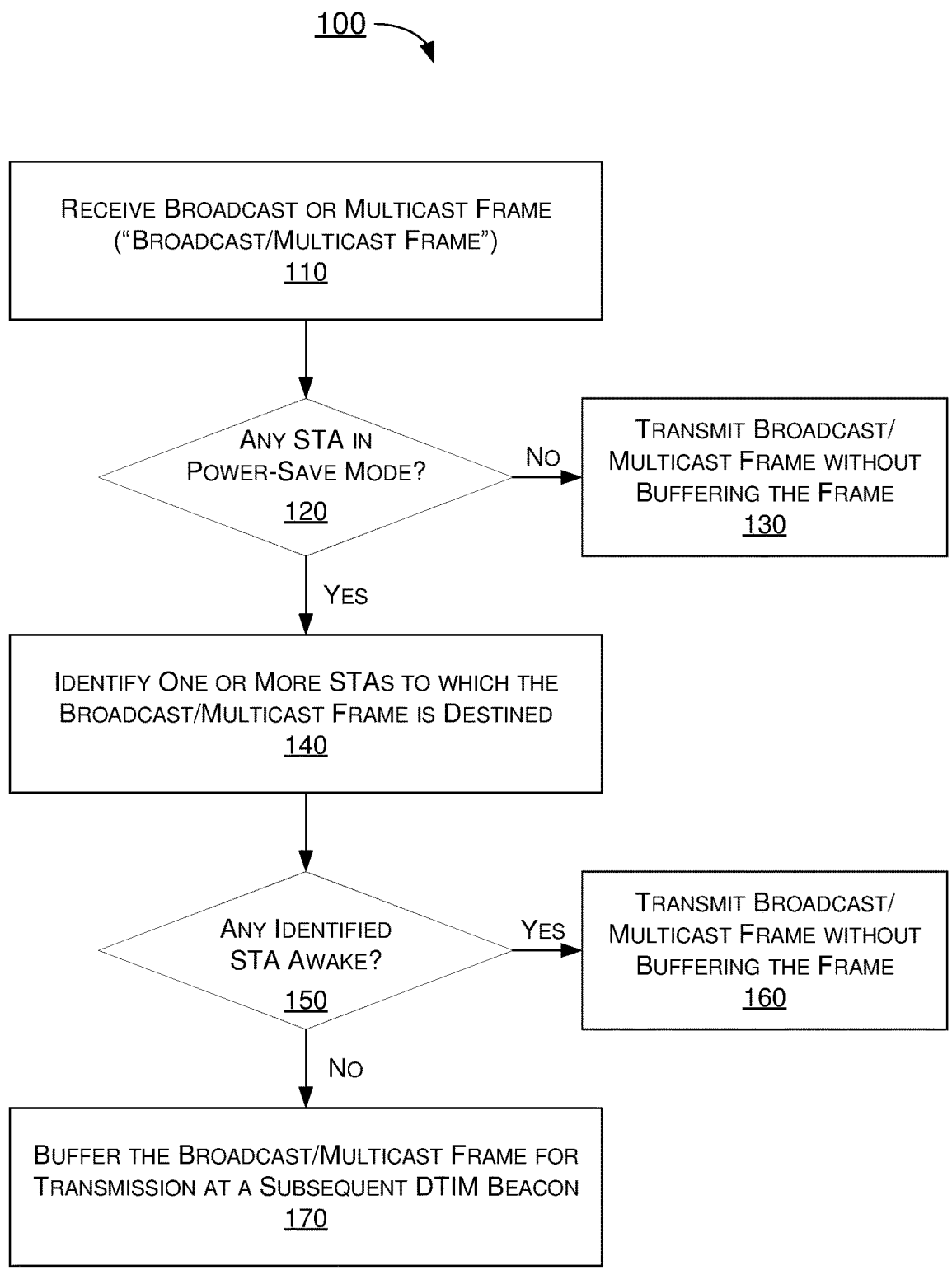
FIG. 1 is a flow diagram of an example scheme in accordance with an implementation of the present disclosure.

FIG. 1 illustrates an example scheme 100 in accordance with an implementation of the present disclosure. Scheme 100 may be an example implementation of an algorithm utilized by an AP or SoftAP for optimization of broadcast and multicast frame delivery when at least one client device in a BSS is in a power-save mode in accordance with the present disclosure. Scheme 100 may be an exception to the DTIM rule under current IEEE 802.11 specifications regarding delivery of a broadcast/multicast frame to a STA in the power-save mode. Scheme 100 may be implemented in the driver or firmware of the AP/SoftAP. Scheme 100 may involve one or more operations, actions, or functions as illustrated by one or more of blocks 110, 120, 130, 140, 150, 160 and 170. Although illustrated as discrete blocks, various blocks of scheme 100 may be divided into additional blocks, combined into fewer blocks, or eliminated, depending on the desired implementation. Moreover, the blocks/sub-blocks of scheme 100 may executed in the order shown in FIG. 1 or, alternatively in a different order. Scheme 100 may be implemented in and by an AP or SoftAP repeatedly. Scheme 100 may begin at block 110.

At 110, scheme 100 may involve the AP/SoftAP receiving a broadcast or multicast frame ("broadcast/multicast frame"). Scheme 100 may proceed from 110 to 120.

At 120, scheme 100 may involve the AP/SoftAP determining whether any client device (herein interchangeably referred as "station" or "STA") in a BSS associated with the AP/SoftAP is in the power-save mode. In an event that the AP/SoftAP determines that there is no STA in the BSS is in the power-save mode, scheme 100 may proceed from 120 to 130. Otherwise, in an event that the AP/SoftAP determines that there is at least one STA in the power-save mode, scheme 100 may proceed from 120 to 140.

At 130, scheme 100 may involve the AP/SoftAP transmitting the broadcast/multicast frame without buffering the broadcast/multicast frame.

At 140, scheme 100 may involve the AP/SoftAP identifying one or more STAs for which the broadcast/multicast frame is destined. Scheme 100 may proceed from 140 to 150.

At 150, scheme 100 may involve the AP/SoftAP determining whether any of the identified one or more STAs is awake (e.g., not in the power-save mode). In an event that the AP/SoftAP determines that there is at least one of the identified one or more STAs being awake, scheme 100 may proceed from 150 to 160. Otherwise, in an event that the AP/SoftAP determines that none of the identified one or more STAs is awake, scheme 100 may proceed from 150 to 170.

At 160, scheme 100 may involve the AP/SoftAP transmitting the broadcast/multicast frame without buffering the broadcast/multicast frame.

At 170, scheme 100 may involve the AP/SoftAP buffering the broadcast/multicast frame for transmission at a subsequent DTIM beacon.

For instance, an AP/SoftAP may check whether a current broadcast frame is destined for any STA in a BSS associated with the AP/SoftAP that is not in the power-save mode. The broadcast frame may be, for example and without limitation, an ARP frame or a DHCP frame. Alternatively, the AP/SoftAP may check whether a current multicast frame is destined for any STA or any group of STAs in the BSS that is/are not in the power-save mode. In an event that the AP/SoftAP identifies any STA or group of STAs not in power-save mode and to which the broadcast/multicast frame is destined, the AP/SoftAP may transmit the broadcast/multicast frame to such STA or group of STAs without buffering the broadcast/multicast frame until a subsequent DTIM period.

Figure 2:
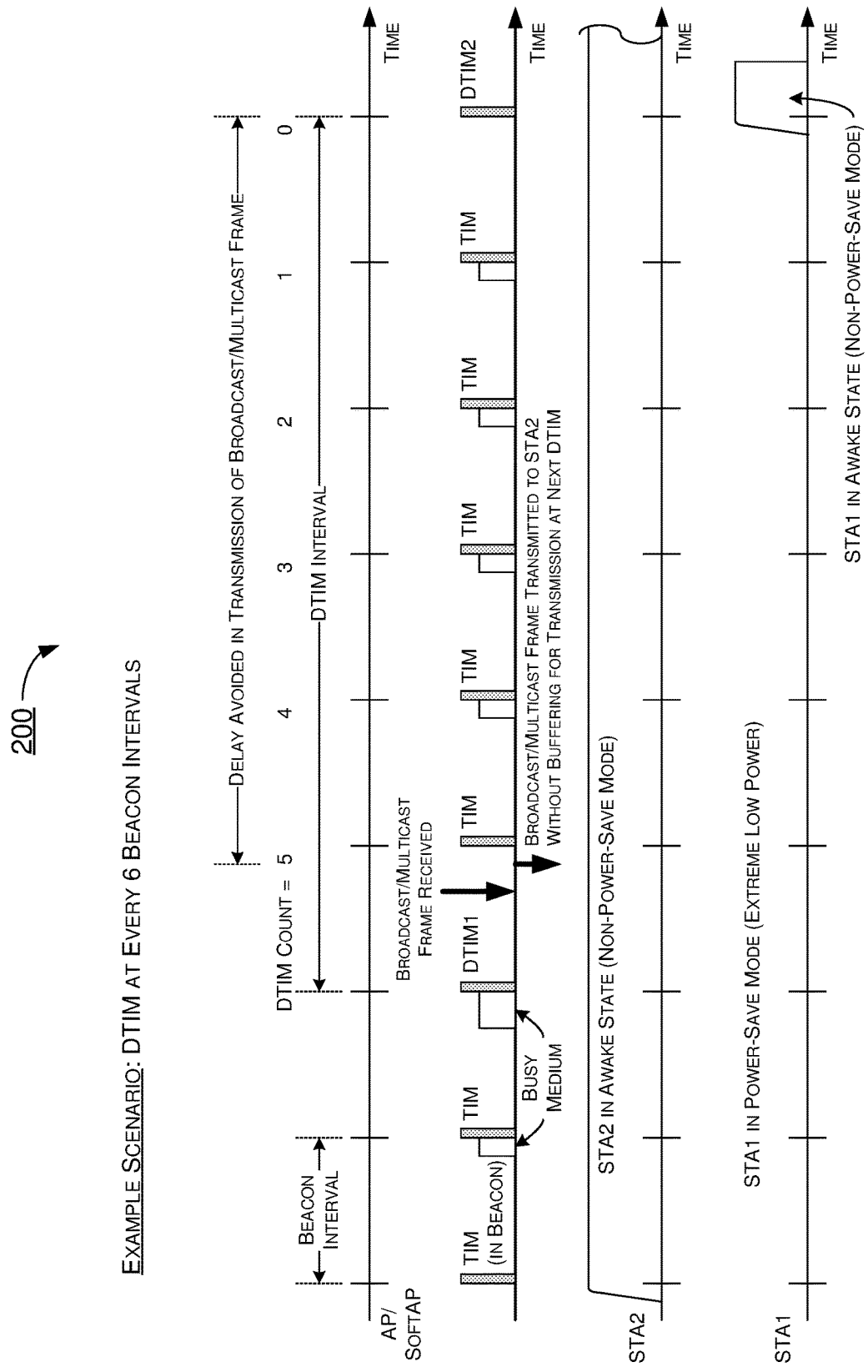
FIG. 2 is a diagram of an example scenario in accordance with an implementation of the present disclosure.

FIG. 2 illustrates an example scenario 200 in accordance with an implementation of scheme 100. For illustrative purposes and simplicity, scenario 200 involves an AP (or SoftAP) and at least two client devices, namely STA1 and STA2, in a BSS associated with the AP/SoftAP. In scenario 200, STA1 may be in a deep power-save mode and STA2 may be in an awake state (e.g., in an active mode).

Referring to FIG. 2, the AP/SoftAP may receive a broadcast/multicast frame after a given DTIM (denoted as "DTIM1" in FIG. 2). The AP/SoftAP may determine for which client device in the BSS the broadcast/multicast frame is destined. In the example shown in FIG. 2, STA2 is the client device for which the broadcast/multicast frame is destined. Upon determining that the broadcast/multicast frame is destined for STA2, the AP/SoftAP may transmit the broadcast/multicast frame in an event that STA2 is in an awake state (e.g., not in a power-save mode) even with STA1 in the power-save mode. Thus, in lieu of buffering the broadcast/multicast frame till a subsequent DTIM (denoted as "DTIM2" in FIG. 2) to transmit the broadcast/multicast frame during the DTIM period following DTIM2, by transmitting the broadcast/multicast frame without buffering the would-be delay in receiving the broadcast/multicast frame from the perspective of STA2 may be avoided. That is, the time delay in delivering the broadcast/multicast frame to STA2, for which the broadcast/multicast frame is destined, may be minimized or otherwise reduced.

In the example shown in FIG. 2, DTIM occurs at every six beacon intervals/DTIM periods. Moreover, in the example shown in FIG. 2, the beacon interval time is 100 msec. Therefore, the delay avoided in scenario 200 is at least five DTIM periods, or 500 msec (=5 DTIM periods×100 msec per DTIM period). In this example, the maximum amount of delay that could be avoided would be 600 msec (=6 DTIM periods×100 msec per DTIM period).

Figure 3:
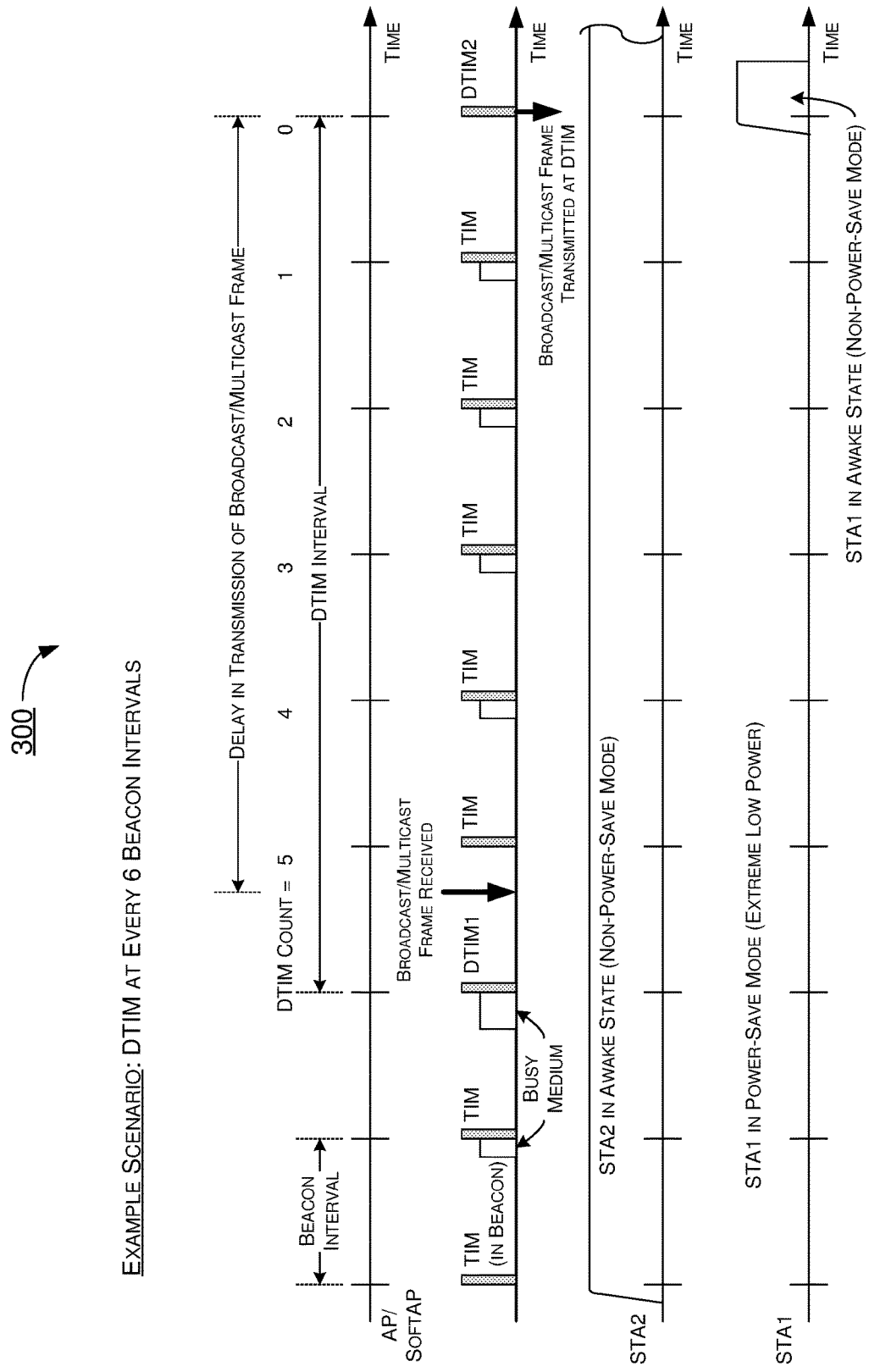
FIG. 3 is a diagram of an example scenario in accordance with the present IEEE 802.11 Power Management Operation.

FIG. 3 illustrates an example scenario 300 in accordance with the present IEEE 802.11 Power Management Operation. For illustrative purposes and simplicity, scenario 300 involves an AP (or SoftAP) and at least two client devices, namely STA1 and STA2, in a BSS associated with the AP/SoftAP. In scenario 300, STA1 may be in a deep power-save mode and STA2 may be in an awake state (e.g., in an active mode).

Referring to FIG. 3, the AP/SoftAP may receive a broadcast/multicast frame after a given DTIM (denoted as "DTIM1" in FIG. 3). The AP/SoftAP may determine for which client device in the BSS the broadcast/multicast frame is destined. In the example shown in FIG. 3, STA2 is the client device for which the broadcast/multicast frame is destined. Upon determining that the broadcast/multicast frame is destined for STA2, by following current IEEE 802.11 specifications, the AP/SoftAP would buffer the broadcast/multicast frame till a subsequent DTIM (denoted as "DTIM2" in FIG. 3) to transmit the broadcast/multicast frame during the DTIM period following DTIM2 merely because STA1 is in the power-save mode. This would create an "unfair" delay in transmission of the broadcast/multicast frame with respect to STA2.

In the example shown in FIG. 3, DTIM occurs at every six beacon intervals/DTIM periods. Moreover, in the example shown in FIG. 3, the beacon interval time is 100 msec. Therefore, the "unfair" delay for STA2 in scenario 300 is at least five DTIM periods, or 500 msec (=5 DTIM periods× 100 msec per DTIM period).

Illustrative Implementations

Figure 4:
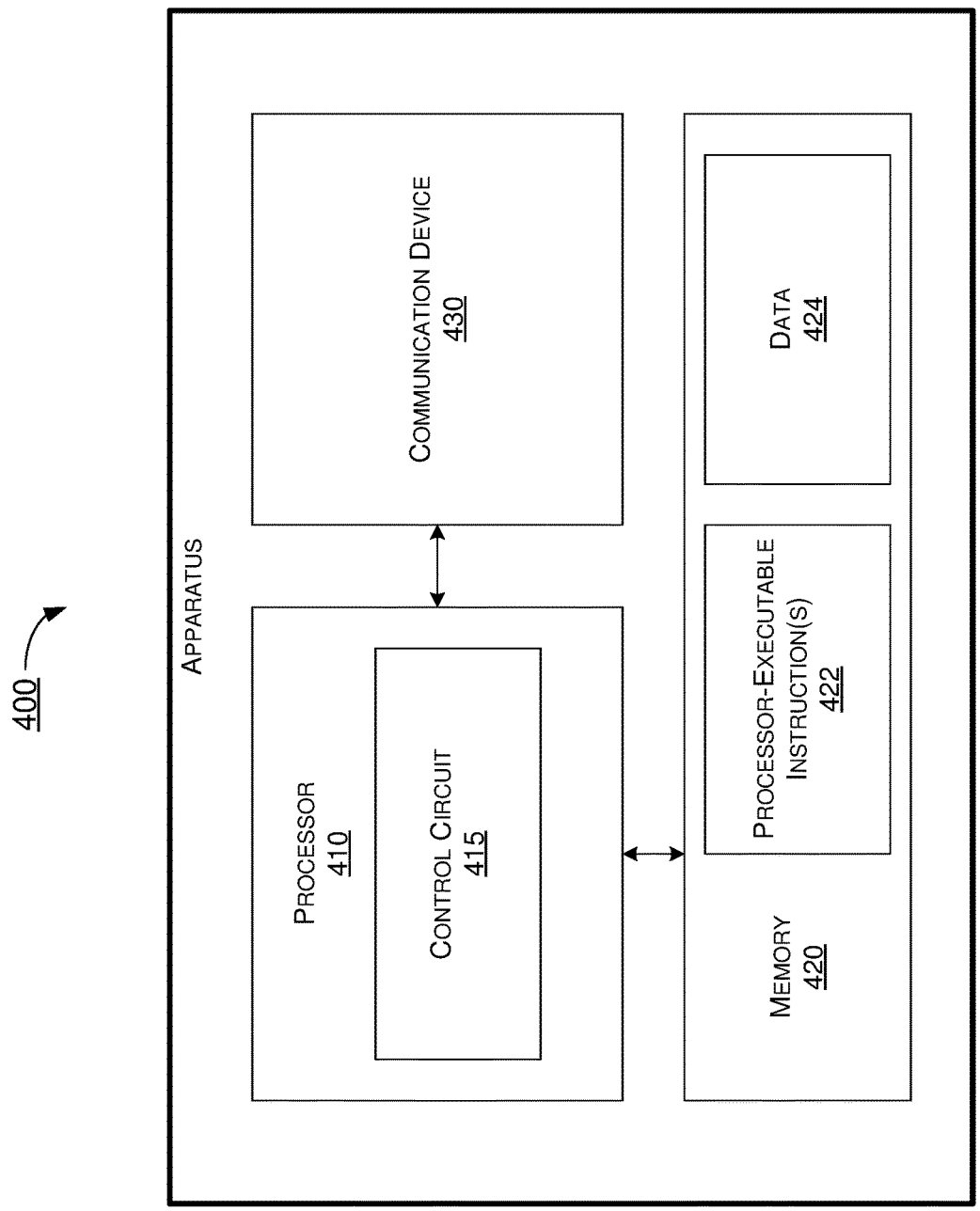
FIG. 4 is a simplified block diagram of an example apparatus in accordance with an implementation of the present disclosure.

FIG. 4 illustrates an example apparatus 400 in accordance with an implementation of the present disclosure. Apparatus 400 may perform various functions to implement schemes, techniques, processes and methods described herein pertaining to loop avoidance in repeater networks, including scheme 100 described above, as well as process 500 described below. Apparatus 400 may be a part of an electronic apparatus which may be a communication device, a computing apparatus, a portable or mobile apparatus, or a wearable apparatus. For instance, apparatus 400 may be implemented in or as an AP, a SoftAP, a smartphone, a smartwatch, a smart bracelet, a smart necklace, a personal digital assistant, or a computing device such as a tablet computer, a laptop computer, a notebook computer, a desktop computer, or a server. Alternatively, apparatus 400 may be implemented in the form of one or more integrated-circuit (IC) chips such as, for example and not limited to, one or more single-core processors, one or more multi-core processors, or one or more complex-instruction-set-computing (CISC) processors. Apparatus 400 may include at least those components shown in FIG. 4, such as a processor 410. Additionally, apparatus 400 may include a communication device 430 which may be a transceiver. Communication device 430 may be configured to transmit and receive data wirelessly (e.g., in compliance with the IEEE 802.11 specification and/or any applicable wireless protocols and standards).

In some implementations, apparatus 400 may include a memory 420. Memory 420 may be a storage device configured to store one or more sets of codes, programs and/or instructions 422 as well as data 424 therein. For example, memory 420 may be operatively coupled to processor 410 to receive data 424 (e.g., buffered frames and/or data packets such as broadcast and/or multicast frames). When apparatus 400 is implemented in or as a first communication device such as a first repeater, memory 420 may store a respective first node number of the first communication device. Memory 420 may be implemented by any suitable technology and may include volatile memory and/or non-volatile memory. For example, memory 420 may include a type of random-access memory (RAM) such as dynamic RAM (DRAM), static RAM (SRAM), thyristor RAM (T-RAM) and/or zero-capacitor RAM (Z-RAM). Alternatively or additionally, memory 420 may include a type of read-only memory (ROM) such as mask ROM, programmable ROM (PROM), erasable programmable ROM (EPROM) and/or electrically erasable programmable ROM (EEPROM). Alternatively or additionally, memory 420 may include a type of non-volatile random-access memory (NVRAM) such as flash memory, solid-state memory, ferroelectric RAM (FeRAM), magnetoresistive RAM (MRAM) and/or phase-change memory.

Processor 410 may be implemented in the form of one or more single-core processors, one or more multi-core processors, or one or more CISC processors. That is, processor 410 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure, including optimization of broadcast and multicast frame delivery when at least one client device in a BSS is in a power-save mode.

Processor 410 may access memory 420 to execute the one or more instructions stored in memory 420. Upon executing the one or more sets of instructions, processor 410 may be configured to perform operations pertaining to optimization of broadcast and multicast frame delivery when at least one client device in a BSS is in a power-save mode in accordance with the present disclosure. In some implementations, processor 410 may include a control circuit 415 capable of performing operations pertaining to optimization of broadcast and multicast frame delivery when at least one client device in a BSS is in a power-save mode in accordance with the present disclosure.

For instance, control circuit 415 may receive, via communication device 430, a broadcast or multicast frame after a first DTIM (e.g., DTIIM1 shown in scenario 200). Additionally, control circuit 415 may transmit, via communication device 430, the broadcast or multicast frame to at least a first client device (e.g., STA2 in scenario 200) in a BSS with which apparatus 400 is associated, without buffering the broadcast or multicast frame for transmission following a second DTIM (e.g., DTIM2 shown in scenario 200) which is subsequent the first DTIM, while at least a second client device (e.g., STA1 in scenario 200) in the BSS is in the power-save mode. The first client device may be in an awake state and not in the power-save mode.

In some implementations, in transmitting the broadcast or multicast frame to at least the first client device in the BSS, control circuit 415 may determine whether any client device in the BSS is in the power-save mode. In some implementations, in determining whether any client device in the BSS is in the power-save mode, control circuit 415 may receive, via communication device 430, information from each client device in the BSS indicating whether the respective client device is in the power-save mode.

In some implementations, in transmitting the broadcast or multicast frame to at least the first client device in the BSS, control circuit 415 may also transmit, via communication device 430, the broadcast or multicast frame to at least a number of client devices of a plurality of client devices in the BSS, including the first client device, without buffering the broadcast or multicast frame responsive to a determination that none of the plurality of client devices is in the power-save mode.

Alternatively, in transmitting the broadcast or multicast frame to at least the first client device in the BSS, control circuit 415 may also perform a number of operations responsive to a determination that at least one of the plurality of client devices is in the power-save mode. For instance, control circuit 415 may identify one or more client devices among the plurality of client devices in the BSS for which the broadcast or multicast frame is destined. Moreover, control circuit 415 may determine whether any of the identified one or more client devices is in not in the power-save mode.

In some implementations, in transmitting the broadcast or multicast frame to at least the first client device in the BSS, control circuit 415 may transmit, via communication device 430, the broadcast or multicast frame to at least one of the identified one or more client devices, including the first client device, without buffering the broadcast or multicast frame responsive to a determination that the at least one of the identified one or more client devices is not in the power-save mode.

Alternatively, in transmitting the broadcast or multicast frame to at least the first client device in the BSS, control circuit 415 may buffer (e.g., in memory 420) the broadcast or multicast frame for transmission following the second DTIM responsive to a determination that each of the identified one or more client devices is in the power-save mode.

In some implementations, the broadcast or multicast frame may include a broadcast frame, and the broadcast frame may include an ARP frame or a DHCP frame.

In some implementations, in transmitting the broadcast or multicast frame, control circuit 415 may transmit, via communication device 430, the broadcast or multicast frame in accordance with IEEE 802.11 specifications.

FIG. 5 illustrates an example process 500 in accordance with an implementation of the present disclosure. Process 500 may represent an aspect of implementing scheme 100, whether partially or completely. Process 500 may include one or more operations, actions, or functions as illustrated by blocks 510 and 520. Although illustrated as discrete blocks, various blocks of process 500 may be divided into additional blocks, combined into fewer blocks, or eliminated, depending on the desired implementation. Process 500 may be implemented by apparatus 400 and any variations thereof. Solely for illustrative purposes, process 500 is described below in the context of apparatus 400 being an AP or SoftAP associated with a BSS. Process 500 may begin at block 510.

At 510, process 500 may involve processor 410 of apparatus 400 receiving, via communication device 430, a broadcast or multicast frame after a first DTIM. Process 500 may proceed from 510 to 520.

At 520, process 500 may involve processor 410 transmitting, via communication device 430, the broadcast or multicast frame to at least a first client device in the BSS, without buffering the broadcast or multicast frame for transmission following a second DTIM which is subsequent the first DTIM, while at least a second client device in the BSS is in a power-save mode.

In some implementations, in transmitting the broadcast or multicast frame to at least the first client device in the BSS, process 500 may involve processor 410 determining whether any client device in the BSS is in the power-save mode.

In some implementations, in transmitting the broadcast or multicast frame to at least the first client device in the BSS, process 500 may also involve processor 410 transmitting, via communication device 430, the broadcast or multicast frame to at least a number of client devices of a plurality of client devices in the BSS, including the first client device, without buffering the broadcast or multicast frame responsive to a determination that none of the plurality of client devices is in the power-save mode.

Alternatively, in transmitting the broadcast or multicast frame to at least the first client device in the BSS, process 500 may also involve processor 410 performing a number of operations responsive to a determination that at least one of the plurality of client devices is in the power-save mode. For instance, process 500 may involve processor 410 identifying one or more client devices among the plurality of client devices in the BSS for which the broadcast or multicast frame is destined. Additionally, process 500 may involve processor 410 determining whether any of the identified one or more client devices is in not in the power-save mode.

In some implementations, in transmitting the broadcast or multicast frame to at least the first client device in the BSS, process 500 may also involve processor 410 transmitting, via communication device 430, the broadcast or multicast frame to at least one of the identified one or more client devices, including the first client device, without buffering the broadcast or multicast frame responsive to a determination that the at least one of the identified one or more client devices is not in the power-save mode.

Alternatively, in transmitting the broadcast or multicast frame to at least the first client device in the BSS, process 500 may involve processor 410 buffering the broadcast or multicast frame for transmission following the second DTIM responsive to a determination that each of the identified one or more client devices is in the power-save mode.

In some implementations, the first client device may be in an awake state and not in the power-save mode.

In some implementations, the broadcast or multicast frame may include a broadcast frame, and the broadcast frame may include an ARP frame or a DHCP frame.

In some implementations, in transmitting the broadcast or multicast frame, process 500 may involve processor 410 transmitting, via communication device 430, the broadcast or multicast frame in accordance with IEEE 802.11 specifications.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    transmitting, by a communication apparatus associated with a basic service set (BSS), a first Delivery Traffic Indication Map (DTIM);
    receiving, by the communication apparatus, a broadcast frame after transmitting the first DTIM;
    transmitting, by the communication apparatus and within a same DTIM period during which the first DTIM is transmitted, the broadcast frame while a first client device in the BSS is actively waiting for a response and while a second client device in the BSS is in a power-save mode, without buffering the broadcast frame for the second client device; and
    transmitting, by the communication apparatus, the second DTIM after one or more DTIM periods from transmitting the broadcast frame.

2. The method of claim 1, wherein the transmitting of the broadcast frame to at least the first client device in the BSS comprises determining whether any client device in the BSS is in the power-save mode.

3. The method of claim 2, wherein the transmitting of the broadcast frame to at least the first client device in the BSS further comprises transmitting the broadcast frame to at least a number of client devices of the plurality of client devices in the BSS, including the first client device, without buffering the broadcast frame responsive to a determination that none of the plurality of client devices is in the power-save mode.

4. The method of claim 2, wherein the transmitting of the broadcast frame to at least the first client device in the BSS further comprises:
    responsive to a determination that at least one of the plurality of client devices is in the power-save mode, performing operations comprising:
        identifying one or more client devices among the plurality of client devices in the BSS for which the broadcast frame is destined; and
        determining whether any of the identified one or more client devices is in or not in the power-save mode.

5. The method of claim 4, wherein the transmitting of the broadcast frame to at least the first client device in the BSS further comprises transmitting the broadcast frame to at least one of the identified one or more client devices, including the first client device, without buffering the broadcast frame responsive to a determination that the at least one of the identified one or more client devices is not in the power-save mode.

6. The method of claim 4, wherein the transmitting of the broadcast frame to at least the first client device in the BSS further comprises buffering the broadcast frame for transmission following the second DTIM responsive to a determination that each of the identified one or more client devices is in the power-save mode.

7. The method of claim 1, wherein the first client device is in an awake state and not in the power-save mode.

8. The method of claim 1, wherein the broadcast frame comprises a broadcast frame, and wherein the broadcast frame comprises an Address Resolution Protocol (ARP) frame or a Dynamic Host Configuration Protocol (DHCP) frame.

9. The method of claim 1, wherein the communication apparatus comprises an access point (AP) or a software-enabled access point (SoftAP).

10. The method of claim 1, wherein the transmitting of the broadcast frame comprises transmitting the broadcast frame in accordance with Institute of Electrical and Electronics Engineers (IEEE) 802.11 specifications.

11. An apparatus, comprising:
    a communication device capable of wirelessly receiving and transmitting data; and a processor coupled to the communication device, the processor capable of performing operations comprising:

transmitting, via the communication device, a first Delivery Traffic Indication Map (DTIM);

receiving, via the communication device, a broadcast frame after transmitting the first DTIM;

transmitting, via the communication device and within a same DTIM period during which the first DTIM is transmitted, the broadcast frame while a first client device in the BSS is actively waiting for a response and while a second client device in the BSS is in a power-save mode, without buffering the broadcast frame for the second client device; and transmitting, via the communication device, the second DTIM after one or more DTIM periods from transmitting the broadcast frame.

12. The apparatus of claim 11, wherein, in transmitting the broadcast frame to at least the first client device in the BSS, the processor determines whether any client device in the BSS is in the power-save mode.

13. The apparatus of claim 12, wherein, in transmitting the broadcast frame to at least the first client device in the BSS, the processor further transmit, via the communication device, the broadcast frame to at least a number of client devices of the plurality of client devices in the BSS, including the first client device, without buffering the broadcast frame responsive to a determination that none of the plurality of client devices is in the power-save mode.

14. The apparatus of claim 12, wherein, in transmitting the broadcast frame to at least the first client device in the BSS, the processor further performs a plurality of operations responsive to a determination that at least one of the plurality of client devices is in the power-save mode, the plurality of operations comprising:

identifying one or more client devices among the plurality of client devices in the BSS for which the broadcast frame is destined; and determining whether any of the identified one or more client devices is in or not in the power-save mode.

15. The apparatus of claim 14, wherein, in transmitting the broadcast frame to at least the first client device in the BSS, the processor transmits, via the communication device, the broadcast frame to at least one of the identified one or more client devices, including the first client device, without buffering the broadcast frame responsive to a determination that the at least one of the identified one or more client devices is not in the power-save mode.

16. The apparatus of claim 14, wherein, in transmitting the broadcast frame to at least the first client device in the BSS, the processor buffers the broadcast frame for transmission following the second DTIM responsive to a determination that each of the identified one or more client devices is in the power-save mode.

17. The apparatus of claim 11, wherein the first client device is in an awake state and not in the power-save mode.

18. The apparatus of claim 11, wherein the broadcast frame comprises a broadcast frame, and wherein the broadcast frame comprises an Address Resolution Protocol (ARP) frame or a Dynamic Host Configuration Protocol (DHCP) frame.

19. The apparatus of claim 12, wherein, in determining whether any client device in the BSS is in the power-save mode, the processor receives, via the communication device, information from each client device in the BSS indicating whether the respective client device is in the power-save mode.

20. The apparatus of claim 11, wherein, in transmitting the broadcast frame, the processor transmits, via the communication device, the broadcast frame in accordance with Institute of Electrical and Electronics Engineers (IEEE) 802.11 specifications.

\* \* \* \* \*